(12) United States Patent
Ye et al.

(10) Patent No.: US 10,798,407 B2
(45) Date of Patent: Oct. 6, 2020

(54) METHODS AND APPARATUS FOR INTER PREDICTION WITH A REDUCED ABOVE LINE BUFFER IN VIDEO CODING

(71) Applicant: TENCENT AMERICA LLC, Palo Alto, CA (US)

(72) Inventors: Jing Ye, San Jose, CA (US); Xiang Li, San Diego, CA (US); Shan Liu, San Jose, CA (US); Xiaozhong Xu, State College, PA (US); Guichun Li, Milpitas, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/233,953

(22) Filed: Dec. 27, 2018

(65) Prior Publication Data

US 2019/0373279 A1 Dec. 5, 2019

Related U.S. Application Data

(60) Provisional application No. 62/679,580, filed on Jun. 1, 2018.

(51) Int. Cl.
*H04N 19/52* (2014.01)
*H04N 19/176* (2014.01)
*H04N 19/159* (2014.01)
*H04N 19/96* (2014.01)

(52) U.S. Cl.
CPC .......... *H04N 19/52* (2014.11); *H04N 19/159* (2014.11); *H04N 19/176* (2014.11); *H04N 19/96* (2014.11)

(58) Field of Classification Search
CPC .. H04N 19/552; H04N 19/159; H04N 19/176; H04N 19/96
See application file for complete search history.

(56) References Cited

U.S. PATENT DOCUMENTS

| | | | |
|---|---|---|---|
| 2005/0259878 A1* | 11/2005 | Drezner | H04N 19/56 382/236 |
| 2012/0213280 A1* | 8/2012 | Srinivasan | H04N 19/51 375/240.13 |
| 2013/0051469 A1* | 2/2013 | Park | H04N 19/159 375/240.14 |
| 2014/0169472 A1* | 6/2014 | Fludkov | H04N 19/52 375/240.16 |
| 2015/0358598 A1* | 12/2015 | Lin | H04N 19/597 375/240.16 |
| 2018/0041769 A1* | 2/2018 | Chuang | H04N 19/176 |
| 2019/0082191 A1* | 3/2019 | Chuang | H04N 19/423 |
| 2019/0132605 A1* | 5/2019 | Deng | H04N 19/51 |

* cited by examiner

*Primary Examiner* — Thai Q Tran
*Assistant Examiner* — Sunghyoun Park
(74) *Attorney, Agent, or Firm* — Sughrue Mion, PLLC

(57) ABSTRACT

A method and apparatus for controlling a motion vector buffer for encoding or decoding of a video sequence includes identifying a set of motion vectors associated with an above coding tree unit (CTU), wherein each motion vector is associated with a P×Q grid, and the set of motion vectors is associated with an N×M grid. A motion vector is determined based on the set of motion vectors. The motion vector, in the motion vector buffer, is accessed based on a candidate block including a position associated with the N×M grid. A current CU can search from each 4×4 position for a current block. When the search range is beyond the current CTU, the motion vector (MV) data from the last row of the above CTU is used.

20 Claims, 12 Drawing Sheets

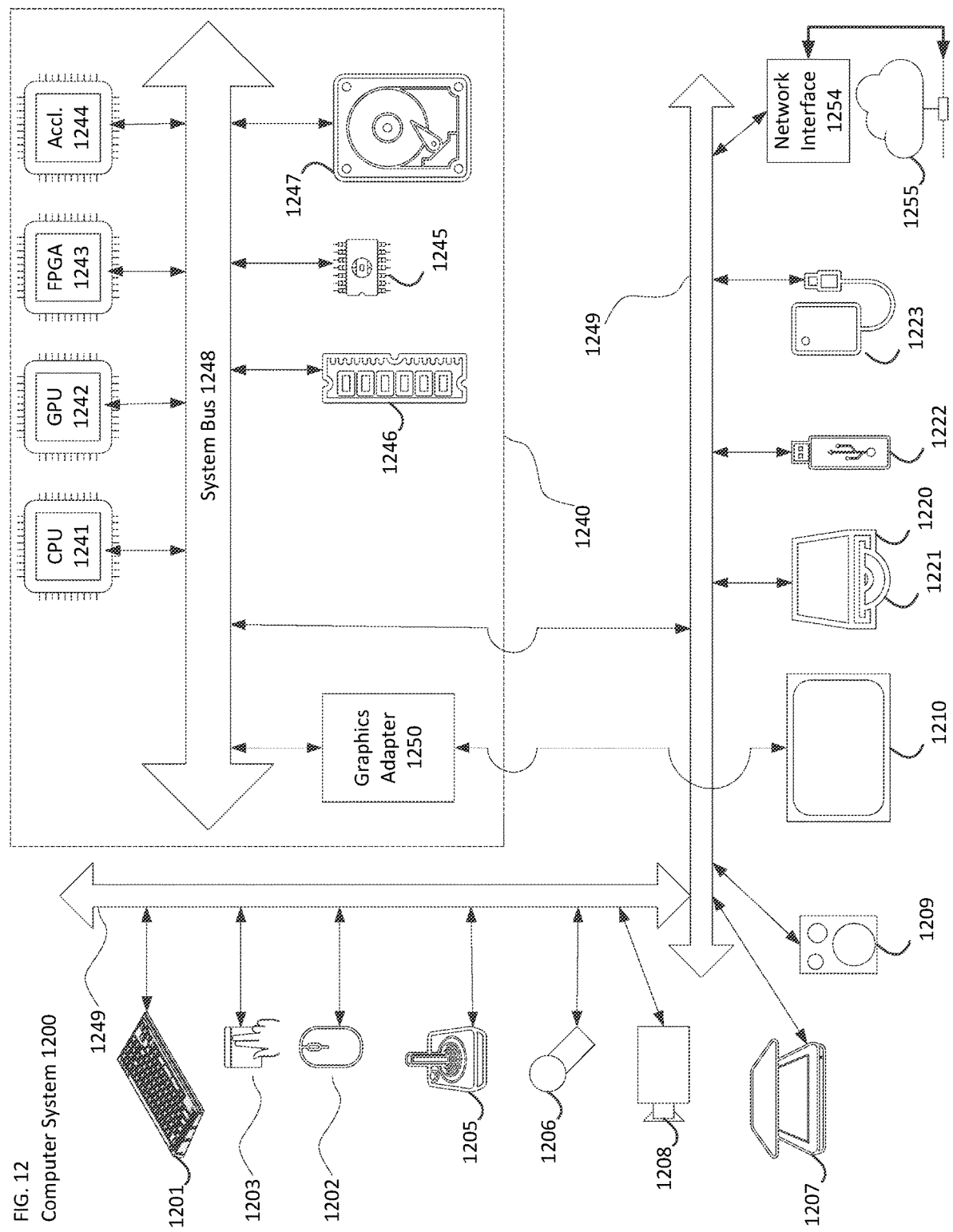

METHODS AND APPARATUS FOR INTER PREDICTION WITH A REDUCED ABOVE LINE BUFFER IN VIDEO CODING

CROSS-REFERENCE TO RELATED APPLICATION

This application claims priority under 35 U.S.C. § 119 from U.S. Provisional Application No. 62/679,580 filed on Jun. 1, 2018 in the U.S. Patent & Trademark Office, the disclosure of which is incorporated herein by reference in its entirety.

FIELD

The present disclosure is directed to inter-picture prediction coding, especially for merge mode. A merge candidates list is generated using extra spatial or temporal merge candidates. The generation of a merge candidate list is modified. A signaling scheme of the merge index is also proposed.

BACKGROUND

In High Efficiency Video Coding (HEVC), a merge mode for inter-picture prediction is introduced. A merge candidate list of candidate motion parameters from neighboring blocks is generated. Then, an index is signaled which identifies the candidates to be used. Merge mode also allows for temporal prediction by including in the list a candidate obtained from previously coded pictures. Referring to FIG. 1, in HEVC, a merge candidates list for a current block 100 is generated based on one or more spatial merge candidates (101), (102), (103), (104), and/or (105), one temporal merge candidate derived from two temporal co-located blocks, and/or additional merge candidates including combined bi-predictive candidates and zero motion vector candidates.

In HEVC, a skip mode is used to indicate for a block that the motion data is inferred instead of explicitly signaled and that the prediction residual is zero, i.e., no transform coefficients are transmitted. In HEVC, at the beginning of each coding unit (CU) in an inter-picture prediction slice, a skip_flag is signaled that implies the following: the CU only contains one prediction unit (PU) (e.g., 2N×2N), the merge mode is used to derive the motion data, and/or no residual data is present in the bitstream.

In Joint Exploration Model 7 (JEM 7), which is the test model software studied by Joint Video Exploration Team (JVET), some new merge candidates were introduced. The sub-CU modes are enabled as additional merge candidates, and there is no additional syntax element required to signal the modes. Two additional merge candidates are added to the merge candidates list of each CU to represent the alternative-temporal motion vector prediction (ATMVP) mode and the spatial-temporal motion vector prediction (STMVP) mode. Up to seven merge candidates are used, if the sequence parameter set indicates that ATMVP mode and STMVP mode are enabled. The encoding logic of the additional merge candidates is the same as for the merge candidates in HEVC, which means, for each CU in predicted (P) or bi-directional predicted (B) slice, two more rate-distortion (RD) checks are needed for the two additional merge candidates. In JEM, the order of the inserted merge candidates is A, B, C, D, ATMVP, STMVP, E (when the merge candidates in the list are less than 6), temporal motion vector prediction (TMVP), combined bi-predictive candidates and zero motion vector candidates.

In the JEM, all bins of merge index are context coded by context-adaptive binary arithmetic coding (CABAC). While in HEVC, only the first bin is context coded and the remaining bins are context by-pass coded. In the JEM, the maximum number of merge candidates are 7.

In the merge candidate list generation process, the above coding tree unit (CTU)'s motion data might be referred to when the current CU is in the CTU vertical boundary. So, there is a line buffer to store the above CTU's last row motion data. The 4×4 grid is used in the motion data storage.

FIG. 2. illustrates an example of the merge candidates list generation. For example, the scheme searches the candidate motion vectors from previously coded blocks, with a step size of 8×8 block. It defines the nearest spatial neighbors of a current block (200), i.e., immediate top row (201), left column (202), and top-right corner (203), as category 1. Other neighbors (204 and 205), such as the outer regions (maximum three 8×8 blocks away from the current block boundary) and the collocated blocks in the previously coded frame are classified as category 2. The neighboring blocks that are predicted from different reference frames or are intra coded are pruned from the list. The remaining reference blocks are then each assigned a weight. The weight is related to the distance to the current block.

In an extended merge mode, the additional merge candidates will be a direct extension of the NEXT merge candidates. The left, above, left bottom, above right, and top left candidates that are not immediately next to the current block are checked. The detailed positions that are checked are shown in FIG. 1. A maximum number of merge candidates might be 10, as an example.

The usage of the TMVP, in ATMVP as well as in the merge mode, requires the storage of the motion data (including motion vectors, reference indices, and coding modes) in co-located reference pictures. Considering the granularity of motion representation, the memory size needed for storing motion data might be significant. HEVC employs motion data storage reduction (MDSR) to reduce the size of the motion data buffer and the associated memory access bandwidth by sub-sampling motion data in the reference pictures. HEVC uses a 16×16 block where, in case of sub-sampling a 4×4 grid, the information of the top-left 4×4 block is stored. Due to this sub-sampling, MDSR impacts the quality of the temporal prediction. Furthermore, there is a tight correlation between the position of the MV used in the co-located picture, and the position of the MV stored by MDSR.

SUMMARY

According to an aspect of the disclosure, a method for controlling a motion vector buffer for encoding or decoding of a video sequence includes identifying a set of motion vectors associated with an above coding tree unit (CTU), wherein each motion vector is associated with a P×Q grid, and the set of motion vectors is associated with an N×M grid; determining a motion vector based on the set of motion vectors; and accessing, in the motion vector buffer, the motion vector based on a candidate block including a position associated with the N×M grid.

According to an aspect of the disclosure, a device for controlling a motion vector buffer for encoding or decoding of a video sequence includes at least one memory configured to store program code; and at least one processor configured to read the program code and operate as instructed by the program code, the program code including: identifying code configured to cause the at least one processor to identify a set of motion vectors associated with an above coding tree unit (CTU), wherein each motion vector is associated with a P×Q grid, and the set of motion vectors is associated with an N×M grid; determining code configured to cause the at least one processor to determine a motion vector based on the set of motion vectors; and accessing code configured to cause the at least one processor to access, in the motion vector buffer, the motion vector based on a candidate block including a position associated with the N×M grid.

According to an aspect of the disclosure, a non-transitory computer-readable medium stores instructions, the instructions comprising: one or more instructions that, when executed by one or more processors of a device, cause the one or more processors to: identify a set of motion vectors associated with an above coding tree unit (CTU), wherein each motion vector is associated with a P×Q grid, and the set of motion vectors is associated with an N×M grid; determine a motion vector based on the set of motion vectors; and access, in the motion vector buffer, the motion vector based on a candidate block including a position associated with the N×M grid.

According to an aspect of the disclosure, a current CU can search from each 4×4 position for a current block. When the search range is beyond the current CTU, the MV data from the last row of the above CTU is used. For a current CU, the motion data for the current CTU is stored for every 4×4 position. When the current CU needs to get access of the MV data from the above CTU, the current CU can obtain the MV data from the last row of the above CTU. When the current CU needs to obtain access to the MV data from the above CUs, and those CUs are within the current CTU, the MV data of those CUs is stored in every 4×4 position. For the above CTU, the current CU can only obtain access to the last row of the MV data. For the CUs within the current CTU, the MV data is stored by 4×4. The offset x and the offset y are the search range for the current CU.

BRIEF DESCRIPTION OF THE DRAWINGS

Further features, the nature, and various advantages of the disclosed subject matter will be more apparent from the following detailed description and the accompanying drawings in which:

FIG. 12 is a diagram of a computer system in accordance with an embodiment.

PROBLEM TO BE SOLVED

Some implementations herein permit a reduction in an above line buffer, thereby conserving memory resources and other computing resources.

DETAILED DESCRIPTION

Figure 1:
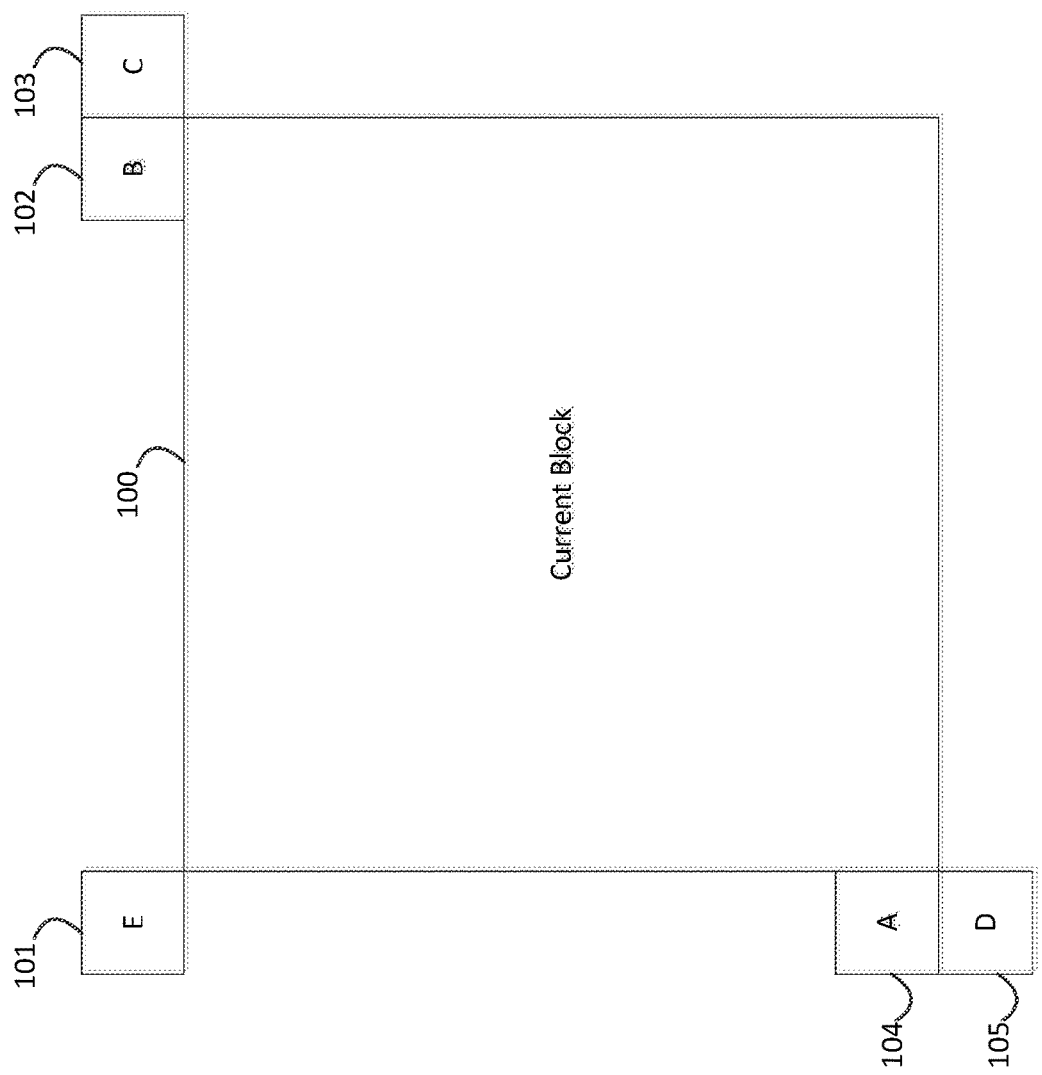
FIG. 1 is a diagram of spatial merge candidates in accordance with an embodiment.
Figure 2:
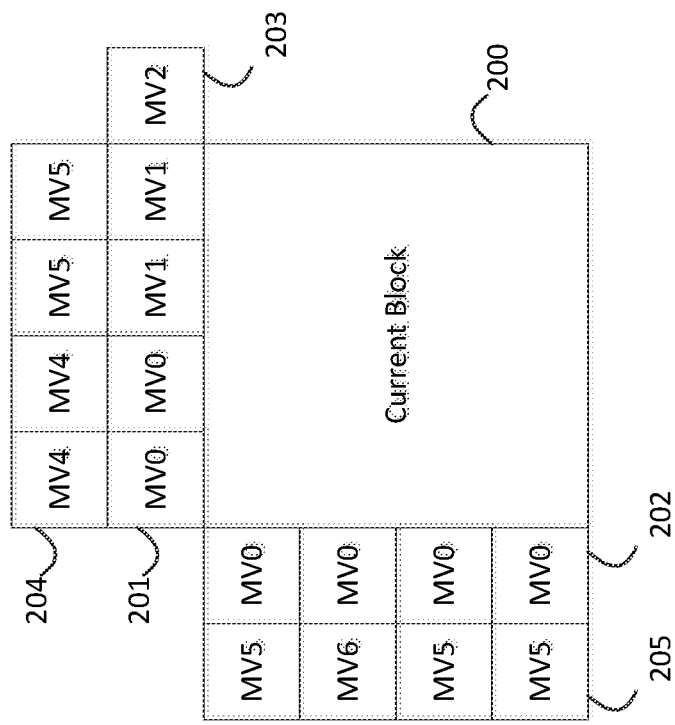
FIG. 2 is a diagram of merge candidate list generation in accordance with an embodiment.
Figure 3:
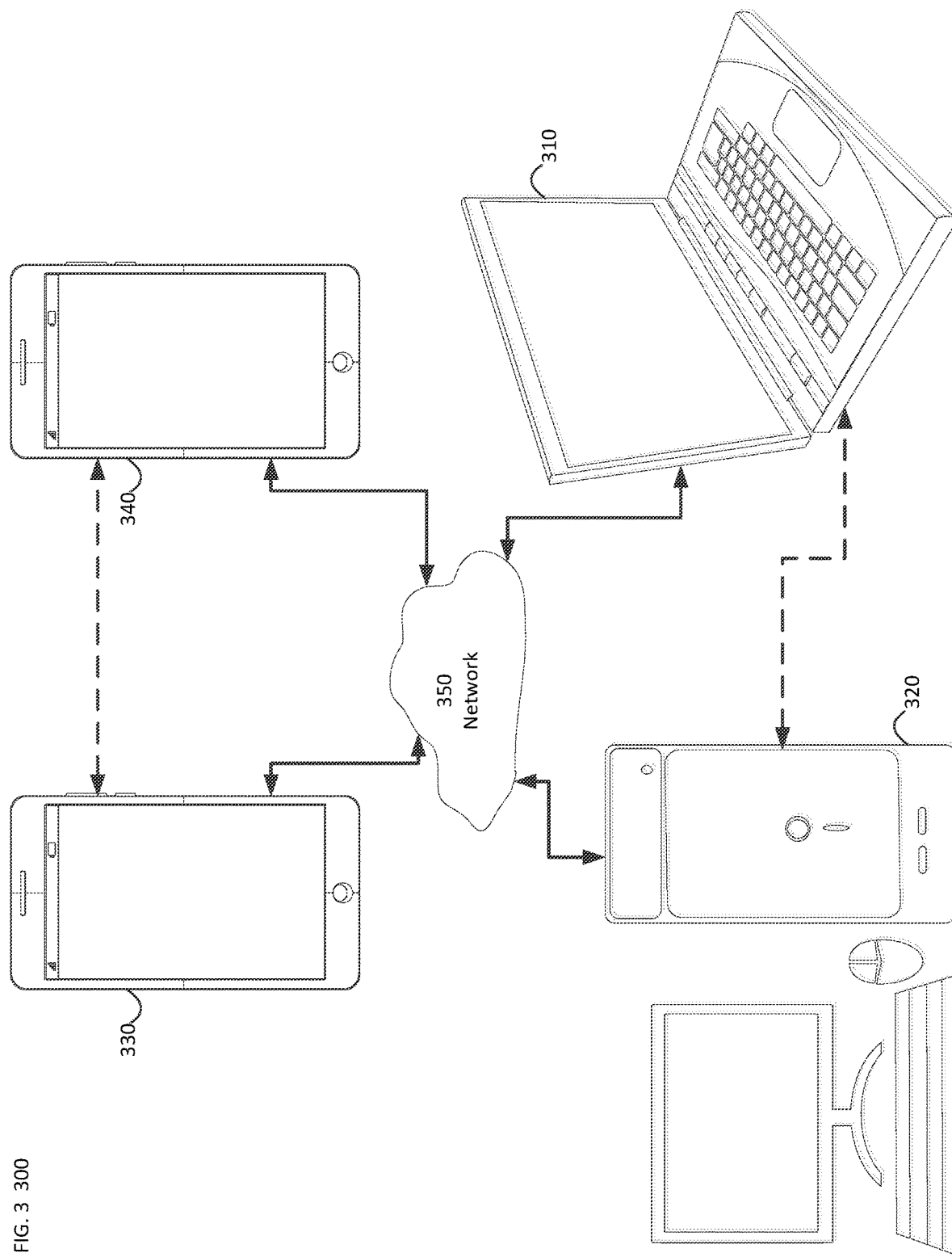
FIG. 3 is a simplified block diagram of a communication system in accordance with an embodiment.

FIG. 3 illustrates a simplified block diagram of a communication system (300) according to an embodiment of the present disclosure. The communication system (300) may include at least two terminals (310-320) interconnected via a network (350). For unidirectional transmission of data, a first terminal (310) may code video data at a local location for transmission to the other terminal (320) via the network (350). The second terminal (320) may receive the coded video data of the other terminal from the network (350), decode the coded data and display the recovered video data. Unidirectional data transmission may be common in media serving applications and the like.

FIG. 3 illustrates a second pair of terminals (330, 340) provided to support bidirectional transmission of coded video that may occur, for example, during videoconferencing. For bidirectional transmission of data, each terminal (330, 340) may code video data captured at a local location for transmission to the other terminal via the network (350). Each terminal (330, 340) also may receive the coded video data transmitted by the other terminal, may decode the coded data and may display the recovered video data at a local display device.

In FIG. 3, the terminals (310-340) may be illustrated as servers, personal computers and smart phones but the principles of the present disclosure are not so limited. Embodiments of the present disclosure find application with laptop computers, tablet computers, media players and/or dedicated video conferencing equipment. The network (350) represents any number of networks that convey coded video data among the terminals (310-340), including for example wireline and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
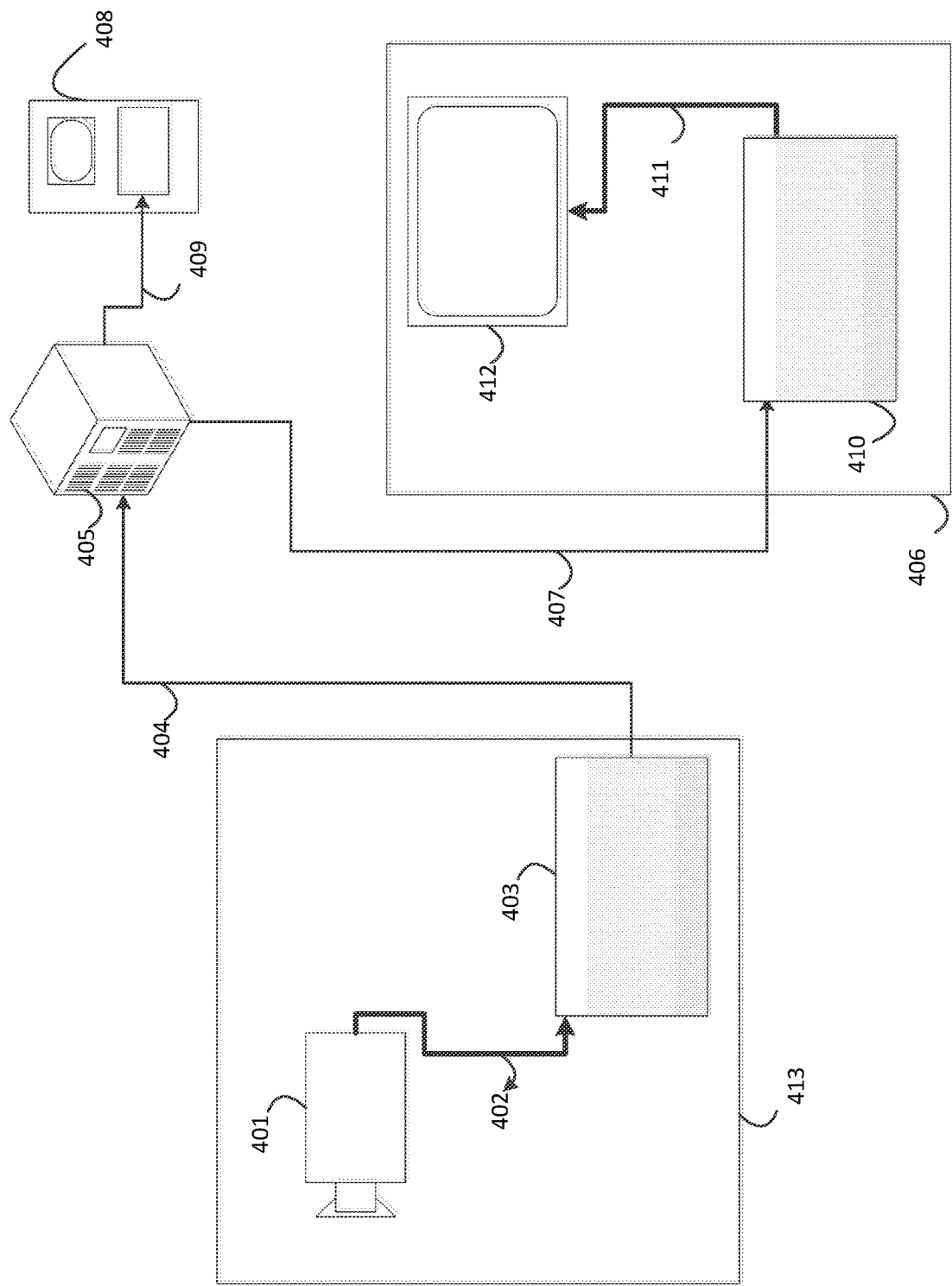
FIG. 4 is a diagram of a streaming environment in accordance with an embodiment.

FIG. 4 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (413), that can include a video source (401), for example a digital camera, creating, for example, an uncompressed video sample stream (402). That sample stream (402), depicted as a bold line to emphasize a high data volume when compared to encoded video bitstreams, can be processed by an encoder (403) coupled to the camera 401). The encoder (403) can include hardware, software, or a combination thereof to enable or implement aspects of the disclosed subject matter as described in more detail below. The encoded video bitstream (404), depicted as a thin line to emphasize the lower data volume when compared to the sample stream, can be stored on a streaming server (405) for future use. One or more streaming clients (406, 408) can access the streaming server (405) to retrieve copies (407, 409) of the encoded video bitstream (404). A client (406) can include a video decoder (410) which decodes the incoming copy of the encoded video bitstream (407) and creates an outgoing video sample stream (411) that can be rendered on a display (412) or other rendering device (not depicted). In some streaming systems, the video bitstreams (404, 407, 409) can be encoded according to certain video coding/compression standards. Examples of those standards include ITU-T Recommendation H.265. Under development is a video coding standard informally known as Versatile Video Coding (VVC). The disclosed subject matter may be used in the context of VVC.

Figure 5:
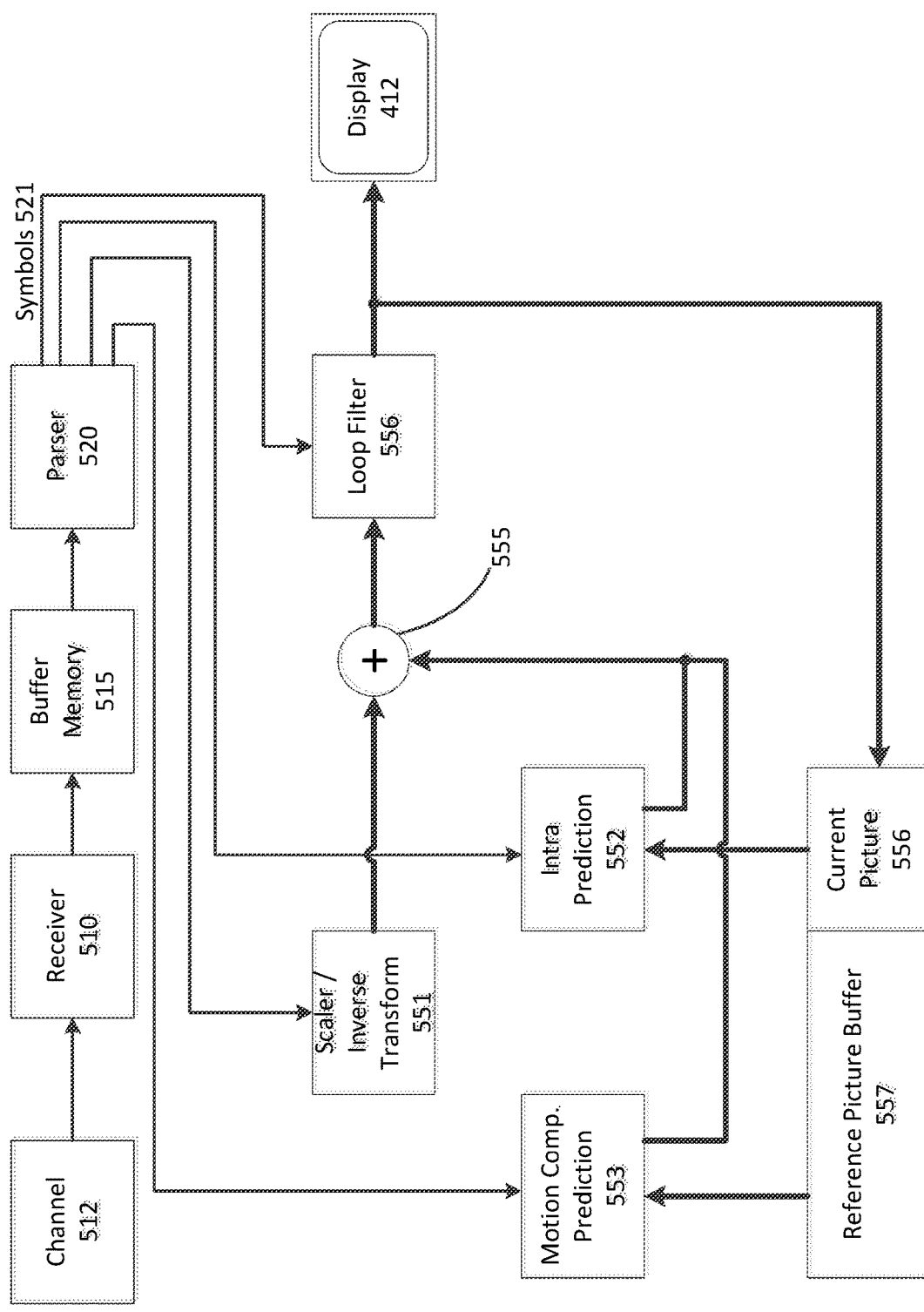
FIG. 5 is a block diagram of a video decoder in accordance with an embodiment.

FIG. 5 may be a functional block diagram of a video decoder (410) according to an embodiment of the present invention.

A receiver (510) may receive one or more codec video sequences to be decoded by the decoder (410); in the same or another embodiment, one coded video sequence at a time, where the decoding of each coded video sequence is independent from other coded video sequences. The coded video sequence may be received from a channel (512), which may be a hardware/software link to a storage device which stores the encoded video data. The receiver (510) may receive the encoded video data with other data, for example, coded audio data and/or ancillary data streams, that may be forwarded to their respective using entities (not depicted). The receiver (510) may separate the coded video sequence from the other data. To combat network jitter, a buffer memory (515) may be coupled in between receiver (510) and entropy decoder/parser (520) ("parser" henceforth). When receiver (510) is receiving data from a store/forward device of sufficient bandwidth and controllability, or from an isosychronous network, the buffer (515) may not be needed, or can be small. For use on best effort packet networks such as the Internet, the buffer (515) may be required, can be comparatively large and can advantageously of adaptive size.

The video decoder (410) may include a parser (520) to reconstruct symbols (521) from the entropy coded video sequence. Categories of those symbols include information used to manage operation of the decoder (410), and potentially information to control a rendering device such as a display (412) that is not an integral part of the decoder but can be coupled to it, as was shown in FIG. 5. The control information for the rendering device(s) may be in the form of Supplementary Enhancement Information (SEI messages) or Video Usability Information (VUI) parameter set fragments (not depicted). The parser (520) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter (QP) values, motion vectors, and so forth.

The parser (520) may perform entropy decoding/parsing operation on the video sequence received from the buffer (515), so to create symbols (521). The parser (520) may receive encoded data, and selectively decode particular symbols (521). Further, the parser (520) may determine whether the particular symbols (521) are to be provided to a Motion Compensation Prediction unit (553), a scaler/inverse transform unit (551), an Intra Prediction Unit (552), or a loop filter (556).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives quantized transform coefficient as well as control information, including which transform to use, block size, quantization factor, quantization scaling matrices, etc. as symbol(s) (621) from the parser (520). It can output blocks comprising sample values, that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current (partly reconstructed) picture (556). The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a Motion Compensation Prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (521) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video bitstream and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (412) as well as stored in the reference picture memory (556) for use in future inter-picture prediction.

Certain coded pictures, once fully reconstructed, can be used as reference pictures for future prediction. Once a coded picture is fully reconstructed and the coded picture has been identified as a reference picture (by, for example, parser (520)), the current reference picture (656) can become part of the reference picture buffer (557), and a fresh current picture memory can be reallocated before commencing the reconstruction of the following coded picture.

The video decoder (410) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (510) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 6:
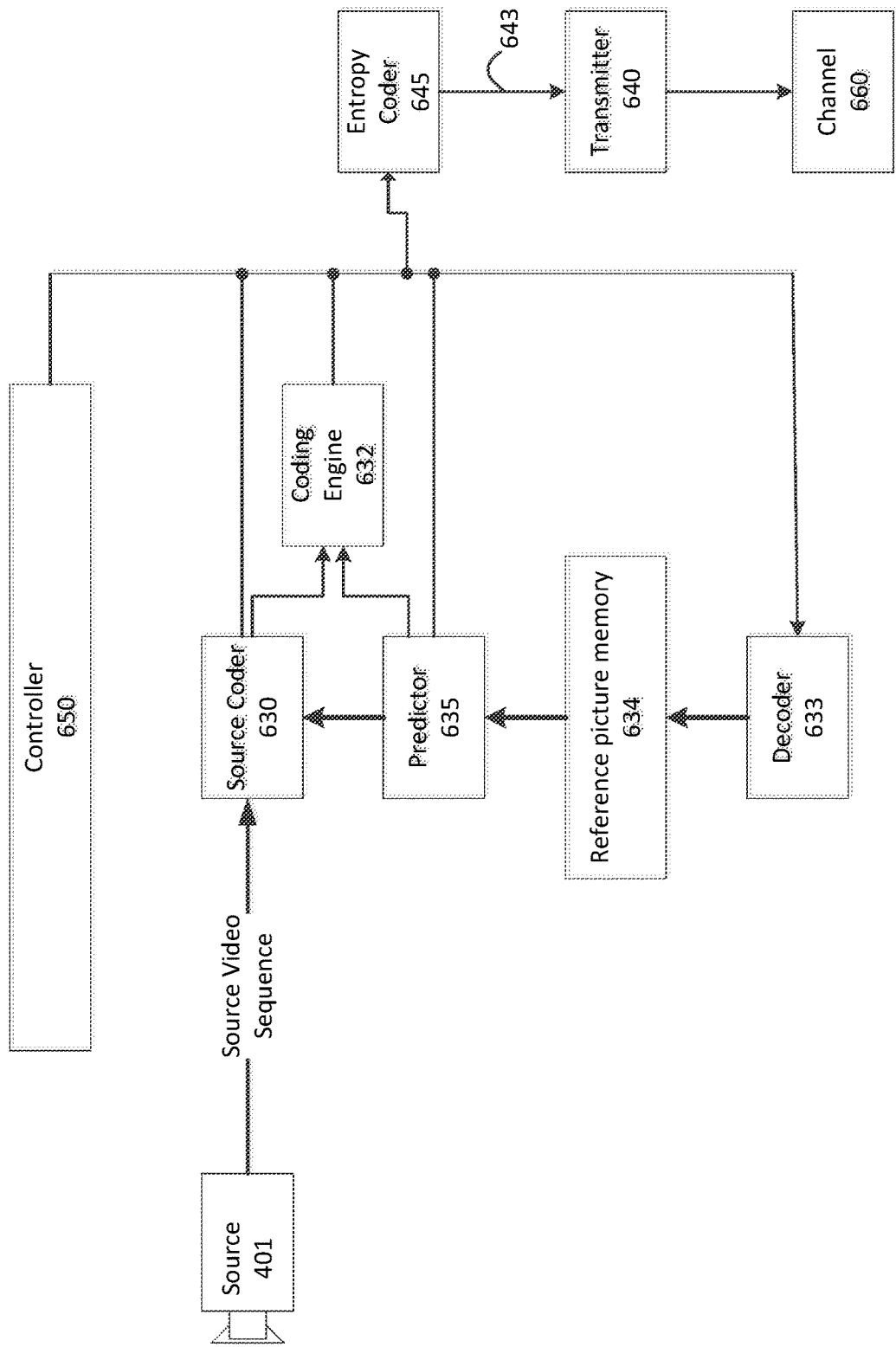
FIG. 6 is a block diagram of a video encoder in accordance with an embodiment.

FIG. 6 may be a functional block diagram of a video encoder (403) according to an embodiment of the present disclosure.

The encoder (403) may receive video samples from a video source (401) (that is not part of the encoder) that may capture video image(s) to be coded by the encoder (403).

The video source (401) may provide the source video sequence to be coded by the encoder (403) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (401) may be a storage device storing previously prepared video. In a videoconferencing system, the video source (403) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder (403) may code and compress the pictures of the source video sequence into a coded video sequence (643) in real time or under any other time constraints as required by the application. Enforcing appropriate coding speed is one function of Controller (650). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (650) as they may pertain to video encoder (403) optimized for a certain system design.

Some video encoders operate in what a person skilled in the art readily recognizes as a "coding loop." As an oversimplified description, a coding loop can consist of the encoding part of an encoder (630) ("source coder" henceforth) (responsible for creating symbols based on an input picture to be coded, and a reference picture(s)), and a (local) decoder (633) embedded in the encoder (403) that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory (634). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (633) can be the same as of a "remote" decoder (410), which has already been described in detail above in conjunction with FIG. 5. Briefly referring also to FIG. 6, however, as symbols are available and en/decoding of symbols to a coded video sequence by entropy coder (645) and parser (520) can be lossless, the entropy decoding parts of decoder (410), including channel (512), receiver (510), buffer (515), and parser (520) may not be fully implemented in local decoder (633).

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder (630) may perform motion compensated predictive coding, which codes an input frame predictively with reference to one or more previously-coded frames from the video sequence that were designated as "reference frames." In this manner, the coding engine (632) codes differences between pixel blocks of an input frame and pixel blocks of reference frame(s) that may be selected as prediction reference(s) to the input frame.

The local video decoder (633) may decode coded video data of frames that may be designated as reference frames, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference frames and may cause reconstructed reference frames to be stored in the reference picture cache (634). In this manner, the encoder (403) may store copies of reconstructed reference frames locally that have common content as the reconstructed reference frames that will be obtained by a far-end video decoder (absent transmission errors).

The predictor (635) may perform prediction searches for the coding engine (632). That is, for a new frame to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the video coder (630), including, for example, setting of parameters and subgroup parameters used for encoding the video data.

Output of all aforementioned functional units may be subjected to entropy coding in the entropy coder (645). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (640) may buffer the coded video sequence(s) as created by the entropy coder (645) to prepare it for transmission via a communication channel (660), which may be a hardware/software link to a storage device which would store the encoded video data. The transmitter (640) may merge coded video data from the video coder (630) with other data to be transmitted, for example, coded audio data and/or ancillary data streams (sources not shown).

The controller (650) may manage operation of the encoder (403). During coding, the controller (650) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (403) may perform coding operations according to a predetermined video coding technology or standard, such as ITU-T Rec. H.265. In its operation, the video coder (403) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The video coder (630) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

The present disclosure is directed to techniques for inter-picture prediction coding, especially for merge mode. When the current CU using the above CU's MV as merge candidates, there might be some CUs that are from another CTU. The proposed technique reduces the line buffers that are needed for fast accessing the MV information of previously coded CUs. The techniques in the present disclosure can be extended to any video coding methods that use the merge concept. Since skip mode will use merge mode to derive the motion information, the methods in the present disclosure also apply to skip mode.

Figure 7:
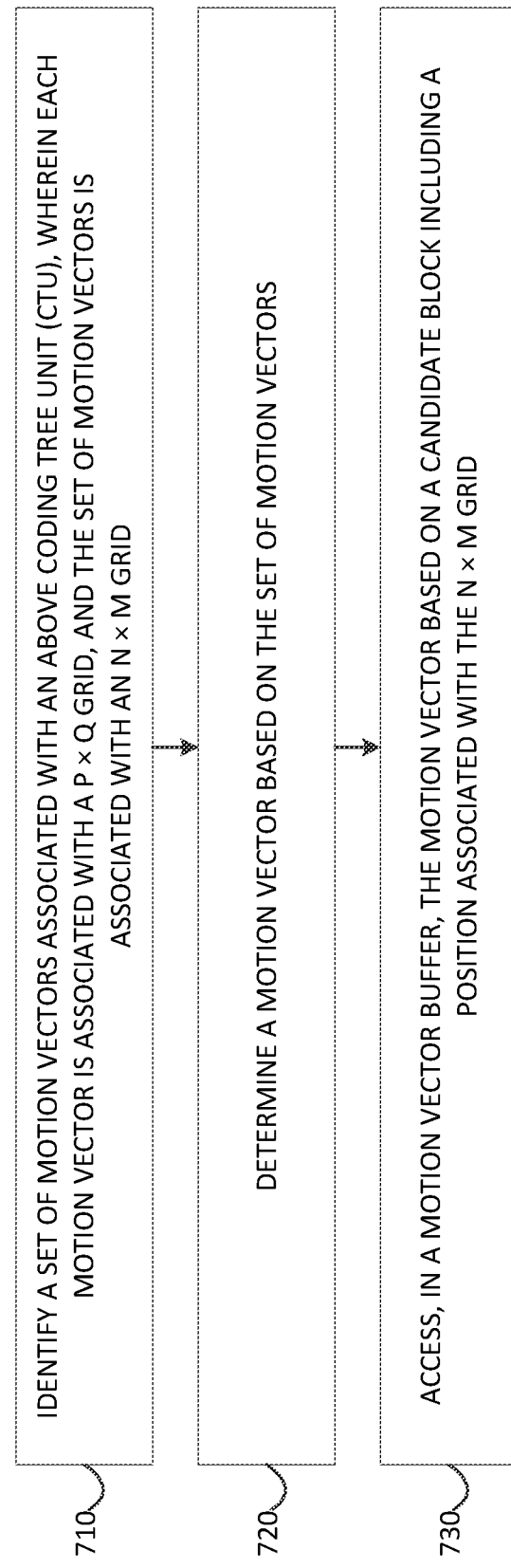
FIG. 7 is a flowchart of an example process for controlling a motion vector buffer for encoding or decoding of a video sequence in accordance with an embodiment.

FIG. 7 is a flowchart is a flowchart of an example process for controlling a motion vector buffer for encoding or decoding of a video sequence in accordance with an embodiment. In some implementations, one or more process blocks of FIG. 7 may be performed by encoder 403. In some implementations, one or more process blocks of FIG. 7 may be performed by another device or a group of devices separate from or including encoder 403, such as decoder 410.

As shown in FIG. 7, a process may include identifying a set of motion vectors associated with an above coding tree unit (CTU), wherein each motion vector is associated with a P×Q grid, and the set of motion vectors is associated with an N×M grid (block 710).

As further shown in FIG. 7, a process may include determining a motion vector based on the set of motion vectors (block 720).

As further shown in FIG. 7, a process may include accessing, in the motion vector buffer, the motion vector based on a candidate block including a position associated with the N×M grid (block 730).

Although FIG. 7 shows example blocks of a process, in some implementations, a process may include additional blocks, fewer blocks, different blocks, or differently arranged blocks than those depicted in FIG. 7. Additionally, or alternatively, two or more of the blocks of a process may be performed in parallel.

Figure 8:
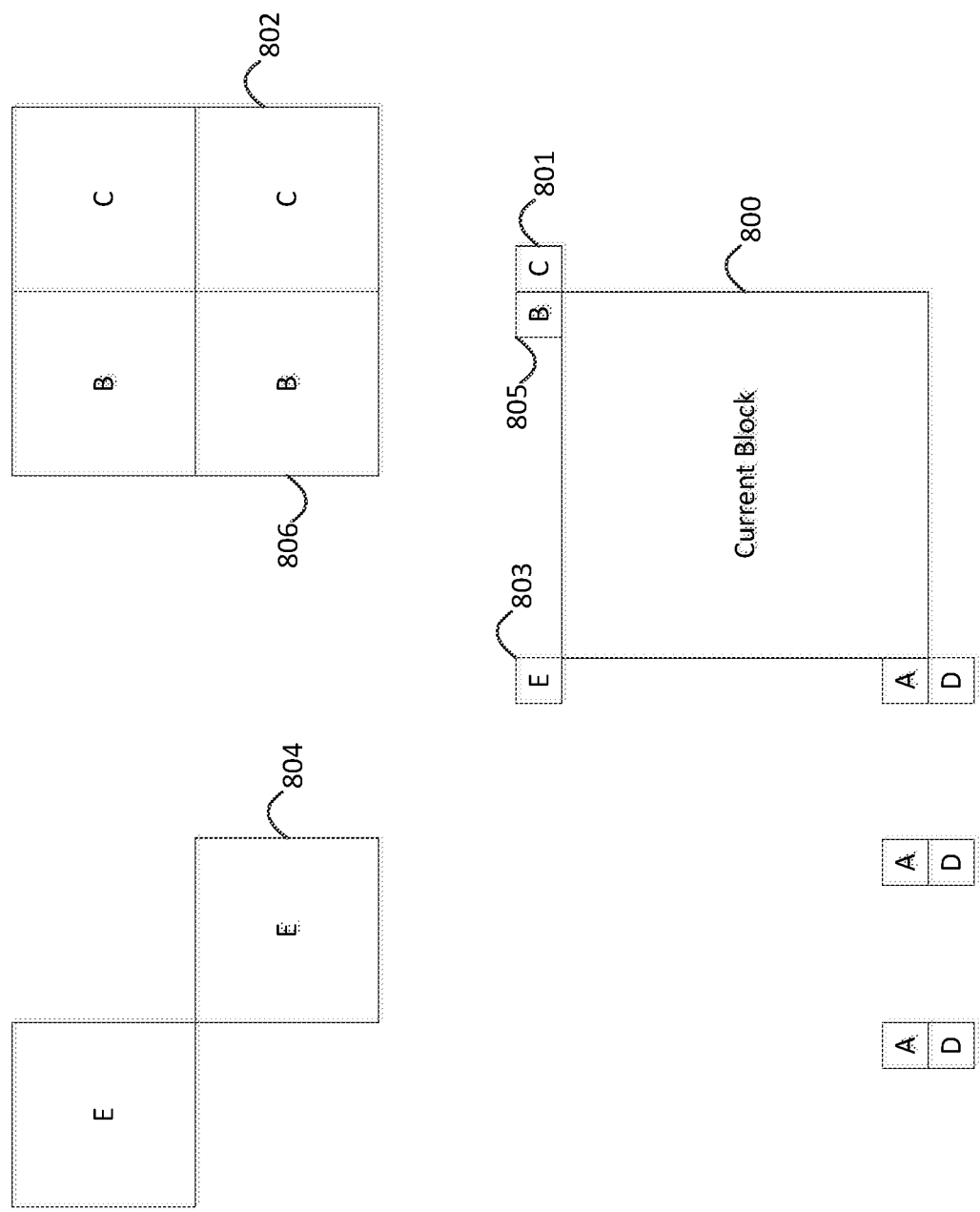
FIG. 8 is a diagram illustrating a reduced line buffer technique in accordance with an embodiment.

FIG. 8 is a diagram illustrating a reduced line buffer technique wherein the MV is being accessed in N×M (e.g., 16×16) positions when the current CU searching in the above CUs for the merge candidates.

As an example, for the current CU, the motion information for the other above CUs are accessed at every N×M position. When the current CU need to get access of the MV data from the above CTU, the current CU can obtain the information that is in every N×M position, where N and M are positive integers.

As another example, for the current CU, the motion information for the other above CUs are accessed at every N×16 position. When the current CU need to get access of the MV data from the above CUs, the current CU can obtain the information that is in every N×16 position, where N is a positive integer, such as 4, 8, 12, 16, and/or the like. Thus, the MV data is sub-sampled for the current frame. For all the above CUs, the MV are accessed by N×16 units. Offset x and offset y are the search range for the current CU.

Figure 9:
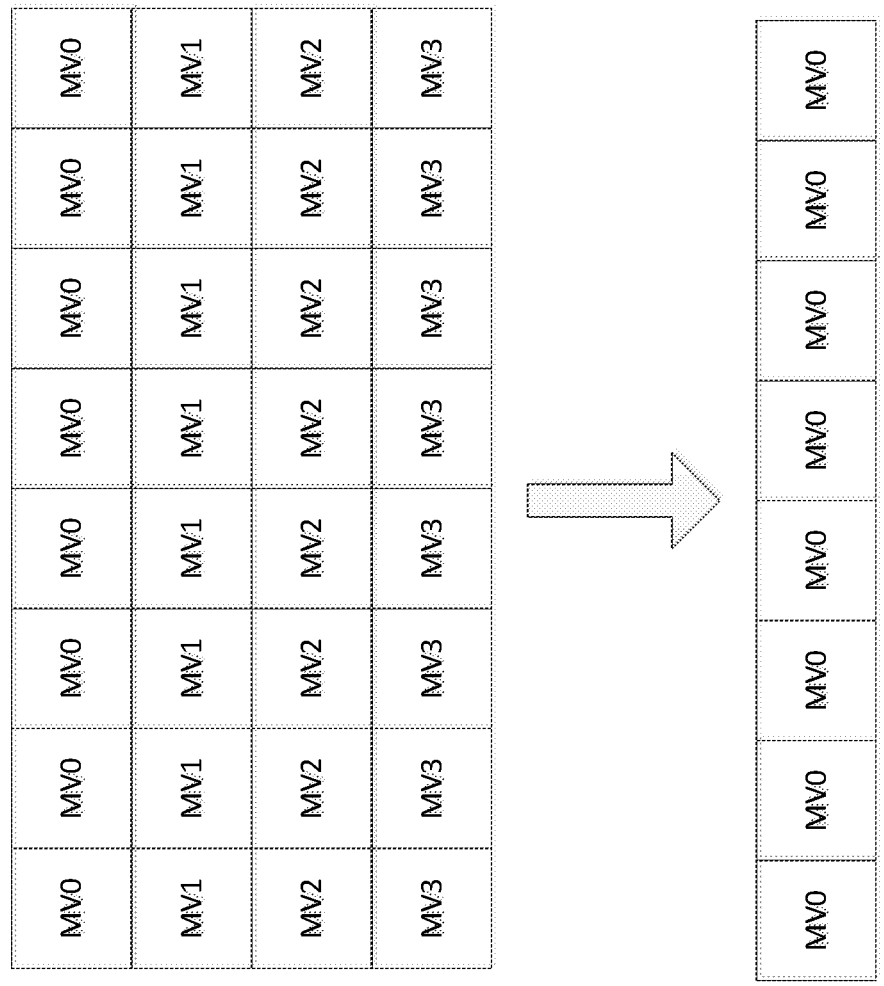
FIG. 9 is a diagram illustrating a reduced line buffer technique in accordance with an embodiment.

The MV data in N×16 (minimum value of N is 4) units may be accessed in any number of ways. Since the minimum unit to store MV data is 4×4, there might be 4 minimum unit rows in a N×16 MV buffer. As shown in FIG. 9, each row is indicated by a number. In one method, MV data in row 0 can be used to denote the MV information for the other rows. Thus, only row 0's MV data might be accessed, and information for the other rows might be ignored. This process may be performed for the entire picture. Thus, from the first row of the picture, the MV data might be accessed in a certain position.

In another embodiment, row 1's MV data can be used to denote all the MV information for the other rows. In yet another embodiment, row 2's MV data can be used to denote all the MV information for the other rows. In yet another embodiment, row 3's information can be used to denote all the MV information for the other rows.

An example of pseudocode to generate the modified row number is shown below. In this example, row 0's information is used to denote the MY information for all four rows. In the below code, y is the vertical coordinate.

```
if (y is in above CTU)
{
    y = (y / 16) * 16;
}
```

In another embodiment, N is equal to M. In one example, N and M are both 16. Embodiments herein are applicable to various ways to use the motion data in 16×16 position. In one embodiment, the top left 4×4 grid in the 16×16 grid is used to denote the entire 16×16 block.

An example of pseudo code to generate the modified row number is shown below. In this example, row 0's information is used to denote the four rows. In the below code, y is the vertical coordinate, and x is the horizontal coordinate.

```
if (y is in above CTU)
{
    y = (y / 16) * 16;
    x = (x / 16) * 16;
}
```

In another embodiment, the average MV from row 0 to row 3 can be used to denote all the row information. In another embodiment, an average MV from row 0 to row 3 can be used to denote all the row information. In the above embodiment, N is not bigger than M.

In another embodiment, the modification can be performed in association with columns in addition to rows. In another embodiment, the MV sub-sampling in the reference picture method can be used to modify the MV position that is being accessed in the current picture.

Figure 10:
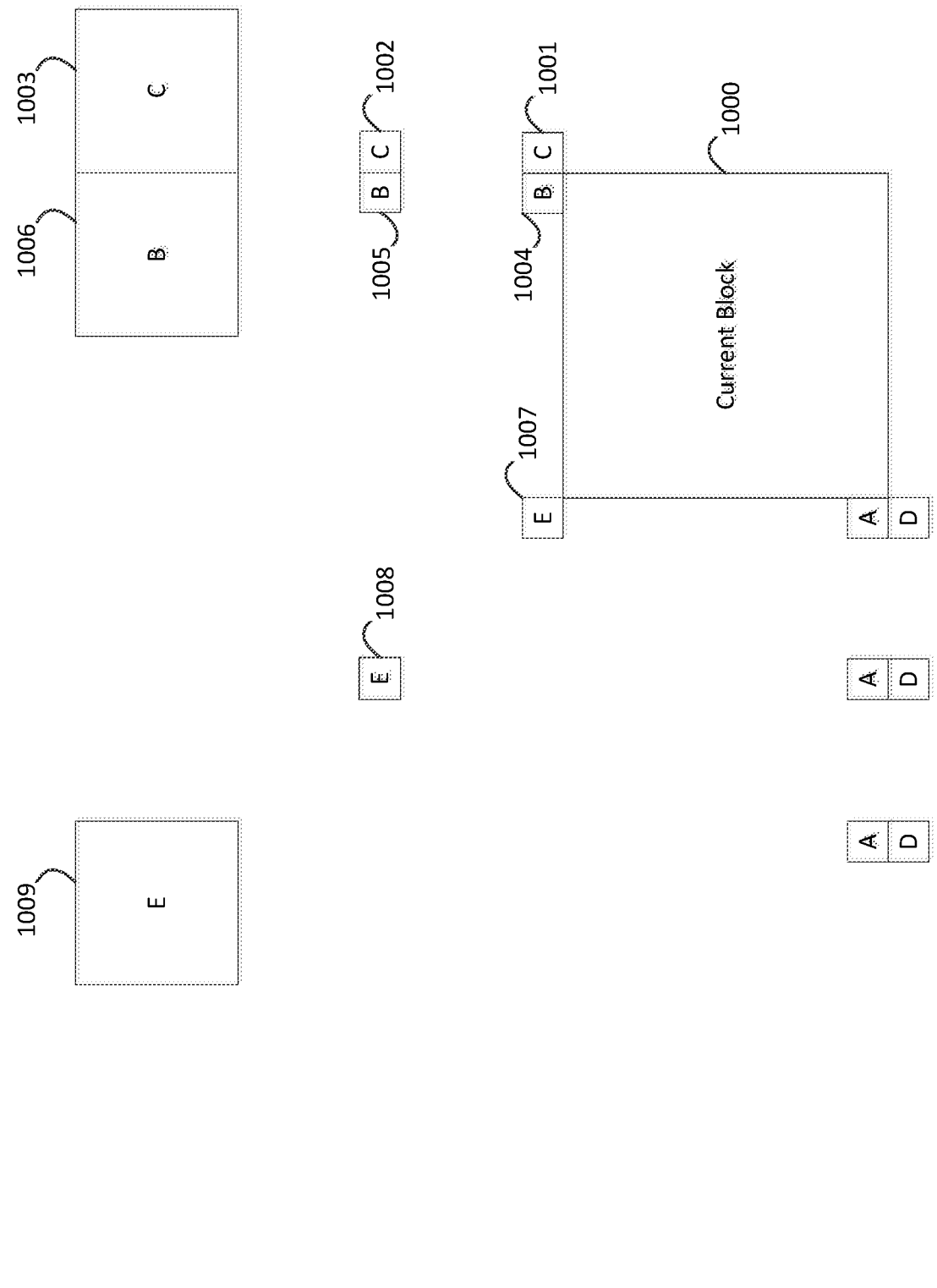
FIG. 10 is a diagram illustrating a reduced line buffer technique in accordance with an embodiment.

FIG. 10 is a diagram illustrating a technique wherein within a current CTU, the current CU can search from each 4×4 position for a current block (1000). When the search range is beyond current CTU, the MV is being accessed in N×M position.

In this method, for the current CU, the motion information for the other above CTUs is being accessed in every N×M position. When the current CU needs to obtain access of the MV data from the above CTU, the current CU can obtain the information that is located in every N×M (for example 16×16) position (1009, 1006, 1003), where N and M are positive integers. When the current CU needs to obtain access to the MV data from the above CUs, and those CUs are within the current CTU, the MV data of those CUs is located in every 4×4 grid.

In an embodiment, for the current CU, the motion information for the other above CTUs is being accessed in every N×16 position. When the current CU needs to obtain access to the MV data from the above CTU, the current CU can obtain the information that is stored in every N×16 position, where N is a positive integer. When the current CU needs to obtain access to the MV data from the above CUs, and those CUs are within current CTU, the MV data of those CUs is located in every 4×4 position (1001, 1002, 1007, 1005, 1008). For the CUs in the above CTU, the MV data is stored by N×16 units. For the CUs within current CTU, the MV data is stored by 4×4 units. The offset x and offset y are the search range for the current CU. In the above embodiment, N is not greater than M.

Figure 11:
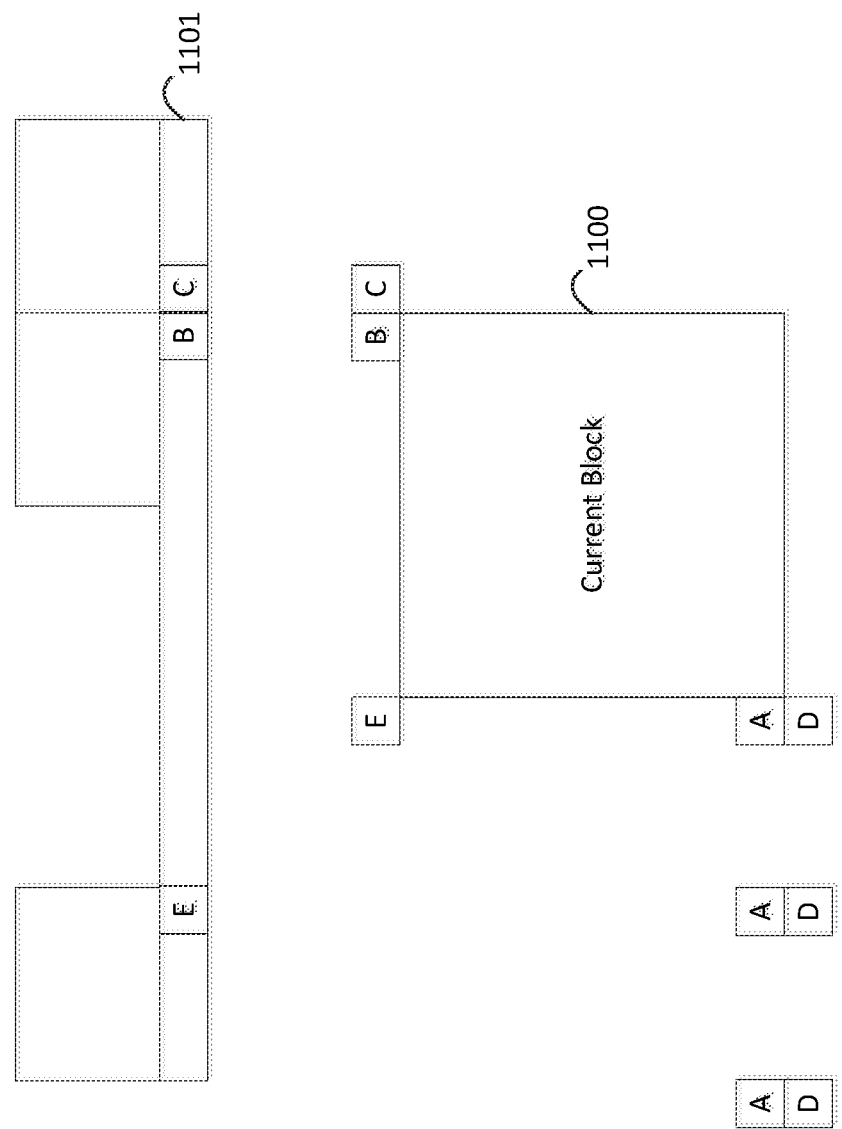
FIG. 11 is a diagram illustrating a reduced line buffer technique in accordance with an embodiment.

FIG. 11 is a diagram illustrating a technique wherein within Current CTU, the current CU can search from each 4×4 position for a current block (1000). When the search range is beyond the current CTU, the MV data from the last row (1101) of the above CTU is used.

In this method, for the current CU, the motion data for the current CTU is stored for every 4×4 position. When the current CU needs to get access to the MV data from the above CTU, the current CU can obtain the MV data from the last row of the above CTU. When the current CU needs to obtain access to the MV data from the above CUs, and those CUs are within the current CTU, the MV data of those CUs is stored in every 4×4 position. For the above CTU, the current CU can only obtain access to the last row of the MV data. For the CUs within current CTU, the MV data is stored by 4×4. The offset x and offset y are the search range for the current CU.

In accordance with an embodiment, the motion information that is in other 4×4 grids (not denoting the N×M position) is not modified or discarded, however, the line buffer is not required to copy the motion information. The line buffer might only copy the motion information in the N×M position.

The techniques described above, can be implemented as computer software using computer-readable instructions and physically stored in one or more computer-readable media. For example, FIG. 12 shows a computer system 1200 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 12 for computer system 1200 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1200.

Computer system 1200 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1201, mouse 1202, trackpad 1203, touch screen 1210, data-glove 1204, joystick 1205, microphone 1206, scanner 1207, camera 1208.

Computer system 1200 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1210, data-glove 1204, or joystick 1205, but there can also be tactile feedback devices that do not serve as input devices), audio output devices (such as: speakers 1209, headphones (not depicted)), visual output devices (such as screens 1210 to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 1200 can also include human accessible storage devices and their associated media such as optical media including CD/DVD ROM/RW 1220 with CD/DVD or the like media 1221, thumb-drive 1222, removable hard drive or solid state drive 1223, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1200 can also include interface(s) to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1249) (such as, for example universal serial bus (USB) ports of the computer system 1200; others are commonly integrated into the core of the computer system 1200 by attachment to a system bus as described below (for example Ethernet interface into a PC computer system or cellular network interface into a smartphone computer system). Using any of these networks, computer system 1200 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 1240 of the computer system 1200.

The core 1240 can include one or more Central Processing Units (CPU) 1241, Graphics Processing Units (GPU) 1242, specialized programmable processing units in the form of Field Programmable Gate Areas (FPGA) 1243, hardware accelerators for certain tasks 1244, and so forth. These devices, along with Read-only memory (ROM) 1245, Random-access memory (RAM) 1246, internal mass storage such as internal non-user accessible hard drives, solid-state drives (SSDs), and the like 1247, may be connected through a system bus 1248. In some computer systems, the system bus 1248 can be accessible in the form of one or more physical plugs to enable extensions by additional CPUs, GPU, and the like. The peripheral devices can be attached either directly to the core's system bus 1248, or through a peripheral bus 1249. Architectures for a peripheral bus include peripheral component interconnect (PCI), USB, and the like.

CPUs 1241, GPUs 1242, FPGAs 1243, and accelerators 1244 can execute certain instructions that, in combination, can make up the aforementioned computer code. That computer code can be stored in ROM 1245 or RAM 1246. Transitional data can be also be stored in RAM 1246, whereas permanent data can be stored for example, in the internal mass storage 1247. Fast storage and retrieve to any of the memory devices can be enabled through the use of cache memory, that can be closely associated with one or more CPU 1241, GPU 1242, mass storage 1247, ROM 1245, RAM 1246, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1200, and specifically the core 1240 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1240 that are of non-transitory nature, such as core-internal mass storage 1247 or ROM 1245. The software implementing various embodiments of the present disclosure can be stored in such devices and executed by core 1240. A computer-readable medium can include one or more memory devices or chips, according to particular needs. The software can cause the core 1240 and specifically the processors therein (including CPU, GPU, FPGA, and the like) to execute particular processes or particular parts of particular processes described herein, including defining data structures stored in RAM 1246 and modifying such data structures according to the processes defined by the software. In addition or as an alternative, the computer system can provide functionality as a result of logic hardwired or otherwise embodied in a circuit (for example: accelerator 1244), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

Acronyms

High Efficiency Video Coding (HEVC)
Coding unit (CU)
Prediction unit (PU)
Joint Exploration Model 7 (JEM 7)
Joint Video Exploration Team (JVET)
Alternative-temporal motion vector prediction (ATMVP)
Spatial-temporal motion vector prediction (STMVP)
Predicted (P) slice
Bi-directional predicted (B) slice
Rate-distortion (RD)
Temporal motion vector prediction (TMVP)
Context-adaptive binary arithmetic coding (CABAC)
Versatile Video Coding (VVC)
Supplementary Enhancement Information (SEI messages)

The invention claimed is:

1. A method for controlling a motion vector buffer for encoding or decoding of a video sequence, the method comprising:
identifying a set of motion vectors associated with a set of blocks of a set of rows of an above coding tree unit (CTU), wherein each motion vector of each block is associated with a P×Q grid, and the set of motion vectors is associated with an N×M grid;
determining a single motion vector, based on the set of motion vectors, to denote motion vector information for each block in each row of the set of rows; and
accessing, in the motion vector buffer, the motion vector based on a candidate block including a position associated with the N×M grid,
wherein each block in each row of the set of rows includes the same single motion vector.

2. The method of claim 1, further comprising:
identifying another motion vector associated with a current CTU, wherein the another motion vector is associated with a P×Q grid; and
accessing, in the motion vector buffer, the another motion vector based on a candidate block including a position associated with the P×Q grid.

3. The method of claim 1, further comprising:
identifying a first motion vector associated with a first row of the set of motion vectors associated with the above CTU; and
determining the single motion vector as the first motion vector.

4. The method of claim 1, further comprising:
determining an average motion vector based on the set of motion vectors; and
determining the single motion vector as the average motion vector.

5. The method of claim 1, further comprising:
determining a last row motion vector of a last row of the above CTU; and
determining the single motion vector as the last row motion vector.

6. The method of claim 1, wherein N×M is 16×16.

7. The method of claim 1, wherein P×Q is 4×4.

8. The method of claim 1, wherein N is not equal to M.

9. The method of claim 1, further comprising:
generating modified row numbers for the set of motion vectors; and
accessing the single motion vector based on the modified row numbers.

10. The method of claim 1, wherein the accessed motion vector permits the encoding or decoding of the video sequence using the single motion vector.

11. A device for controlling a motion vector buffer for encoding or decoding of a video sequence, comprising:

at least one memory configured to store program code;

at least one processor configured to read the program code and operate as instructed by the program code, the program code including:

identifying code configured to cause the at least one processor to identify a set of motion vectors associated with a set of blocks of a set of rows of an above coding tree unit (CTU), wherein each motion vector of each block is associated with a P×Q grid, and the set of motion vectors is associated with an N×M grid;

determining code configured to cause the at least one processor to determine a single motion vector, based on the set of motion vectors, to denote motion vector information for each block in each row of the set of rows; and accessing code configured to cause the at least one processor to access, in the motion vector buffer, the motion vector based on a candidate block including a position associated with the N×M grid, wherein each block in each r of the se of rows includes the same single motion vector.

12. The device of claim 11, further comprising:

other identifying code configured to cause the at least one processor to identify another motion vector associated with a current CTU, wherein the another motion vector is associated with a P×Q grid; and wherein the accessing code is configured to cause the at least one processor to access, in the motion vector buffer, the another motion vector based on a candidate block including a position associated with the P×Q grid.

13. The device of claim 11, further comprising:

other identifying code configured to cause the at least one processor to identify a first motion vector associated with a first row of the set of motion vectors associated with the above CTU; and wherein the determining code is configured to cause the at least one processor to determine the single motion vector as the first motion vector.

14. The device of claim 11, further comprising:

other determining code configured to cause the at least one processor to determine an average motion vector based on the set of motion vectors; and wherein the determining code is configured to cause the at least one processor to determine the single motion vector as the average motion vector.

15. The device of claim 11, further comprising:

other determining code configured to cause the at least one processor to determine a last row motion vector of a last row of the above CTU; and wherein the determining code is configured to cause the at least one processor to determine the single motion vector as the last row motion vector.

16. The device of claim 11, wherein N×M is 16×16.

17. The device of claim 11, wherein P×Q is 4×4.

18. The device of claim 11, wherein N is not equal to M.

19. The device of claim 11, wherein the accessed motion vector permits the encoding or decoding of the video sequence using the single motion vector.

20. A non-transitory computer-readable medium storing instructions, the instructions comprising: one or more instructions that, when executed by one or more processors of a device, cause the one or more processors to:

identify a set of motion vectors associated with a set of blocks of a set of rows of an above coding tree unit (CTU), wherein each motion vector of each block is associated with a P×Q grid, and the set of motion vectors is associated with an N×M grid;

determine a single motion vector, based on the set of motion vectors, to denote motion vector information for each block in each row of the set of rows; and access, in the motion vector buffer, the motion vector based on a candidate block including a position associated with the N×M grid, wherein each block in each row of the set of rows includes the same single motion vector.

\* \* \* \* \*